(12) United States Patent
Winslow

(10) Patent No.: US 6,827,151 B1
(45) Date of Patent: Dec. 7, 2004

(54) SPRIG HARVESTER

(76) Inventor: N. Ernest Winslow, 1005 Stamper Siding Rd., Scotland Neck, NC (US) 27874-8791

( * ) Notice: Subject to any disclaimer, the term of this patent is extended or adjusted under 35 U.S.C. 154(b) by 0 days.

(21) Appl. No.: 10/356,816

(22) Filed: Feb. 3, 2003

(51) Int. Cl.⁷ .................................................. E02F 1/00
(52) U.S. Cl. ........................................................ 172/32
(58) Field of Search ............................ 172/19, 20, 32; 56/16.6, 185, 228, 327.1, DIG. 13; 171/116, 126, 130, 138

(56) References Cited

U.S. PATENT DOCUMENTS

| | | | |
|---|---|---|---|
| 3,116,795 A | * | 1/1964 | Overstreet .................. 171/116 |
| 3,410,350 A | * | 11/1968 | Ware ............................ 172/32 |
| RE34,827 E | | 1/1995 | Dover et al. |
| 5,528,890 A | * | 6/1996 | Gray et al. .................. 56/16.6 |
| 5,626,195 A | | 5/1997 | Dover |

\* cited by examiner

*Primary Examiner*—Robert E Pezzuto
(74) *Attorney, Agent, or Firm*—Coats & Bennett, P.L.L.C.

(57) ABSTRACT

A sprig harvester for harvesting sprigs. The sprig harvester includes a mainframe and at least one turf cutting head mounted on a front portion of the mainframe. Disposed rearwardly of the turf cutting head is a shredder. Extending between the turf cutting head and the shedder is a conveyor that conveys the swath or pieces of turf from the cutting head into the shredder. Once deposited within the shredder, the swath of turf is shredded into sprigs that are discharged from the shredder onto a conveyor and are conveyed therefrom to a discharge area.

27 Claims, 6 Drawing Sheets

SPRIG HARVESTER

FIELD OF THE INVENTION

The present invention relates to sod or turf harvesting, and more particularly to a sod or turf harvester that in the process of harvesting produces sprigs.

SUMMARY OF THE INVENTION

The present invention entails a sprig harvester for harvesting sprigs. The harvester includes a mainframe and at least one turf or sod cutting head for cutting a swath or piece of turf from a field being traversed by the sprig harvester. Further, the sprig harvester includes a conveyor disposed adjacent the turf cutting head for conveying the swath or piece of turf from the cutting head. A turf shredder is provided on the harvester for receiving at least a portion of the swath or piece of turf and shredding the turf into sprigs.

In one particular embodiment, the shredder, mounted on the harvester, includes a rotary assembly having a plurality of radials or tines extending therefrom. Disposed adjacent the rotary assembly is a concave that cooperates with the rotary assembly to shred the turf into sprigs. In one particular embodiment of the present invention, there is provided a set of blades or projections that project from an inner side of the concave towards the rotary assembly such that as the rotary assembly is driven, the radials pass between the blades or projections extending from the concave such that the radials and blades or projections cooperate to shred the turf into sprigs.

Another aspect of the present invention relates to a method of harvesting sprigs. This method entails traversing a field of turf or sod with a harvester and cutting a swath or piece of turf with the harvester and conveying the swath or piece of turf to a shredder on the harvester. Once at the shredder, the turf is shredded by the shredder into sprigs.

Other objects and advantages of the present invention will become apparent and obvious from a study of the following description and the accompanying drawings, which are merely illustrative of such invention.

DESCRIPTION OF EXEMPLARY EMBODIMENT

With further reference to the drawings, the sprig harvester 10 of the present invention is shown therein and indicated generally by the numeral 10. While the sprig harvester 10 could very well be self-propelled, in the embodiment illustrated herein the sprig harvester is of the pull type and is adapted to be connected to a tractor which in turn pulls the sprig harvester through a field of turf or sod. In addition, the sprig harvester 10 is designed to pull a wagon which functions to receive the harvested sprigs. However, it is appreciated that the sprig harvester 10 could be provided with an onboard bin or container for receiving and holding the sprigs during the harvesting operation.

Figure 1:
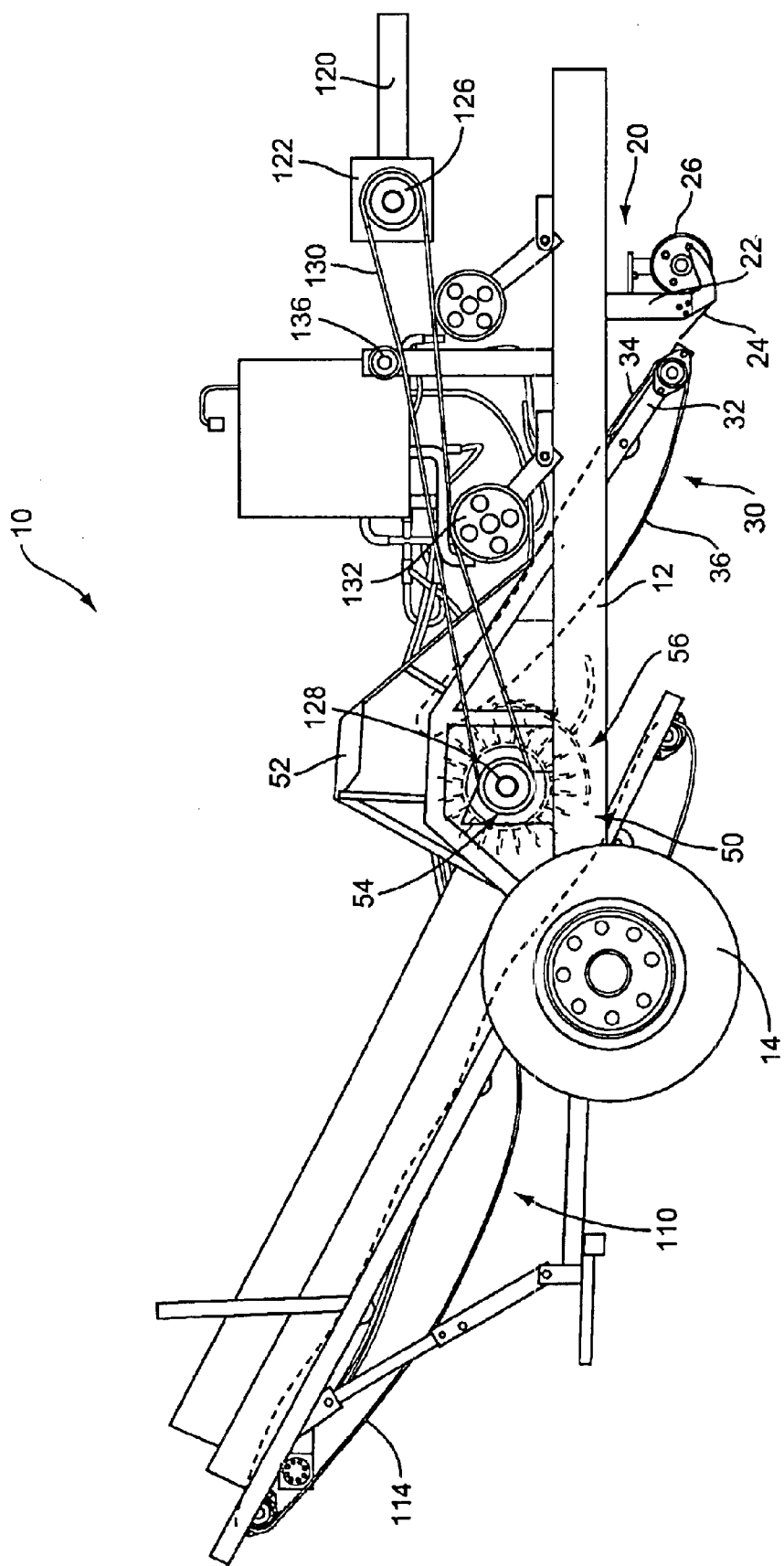
FIG. 1 is a side elevational view of the sprig harvester.
Figure 4:
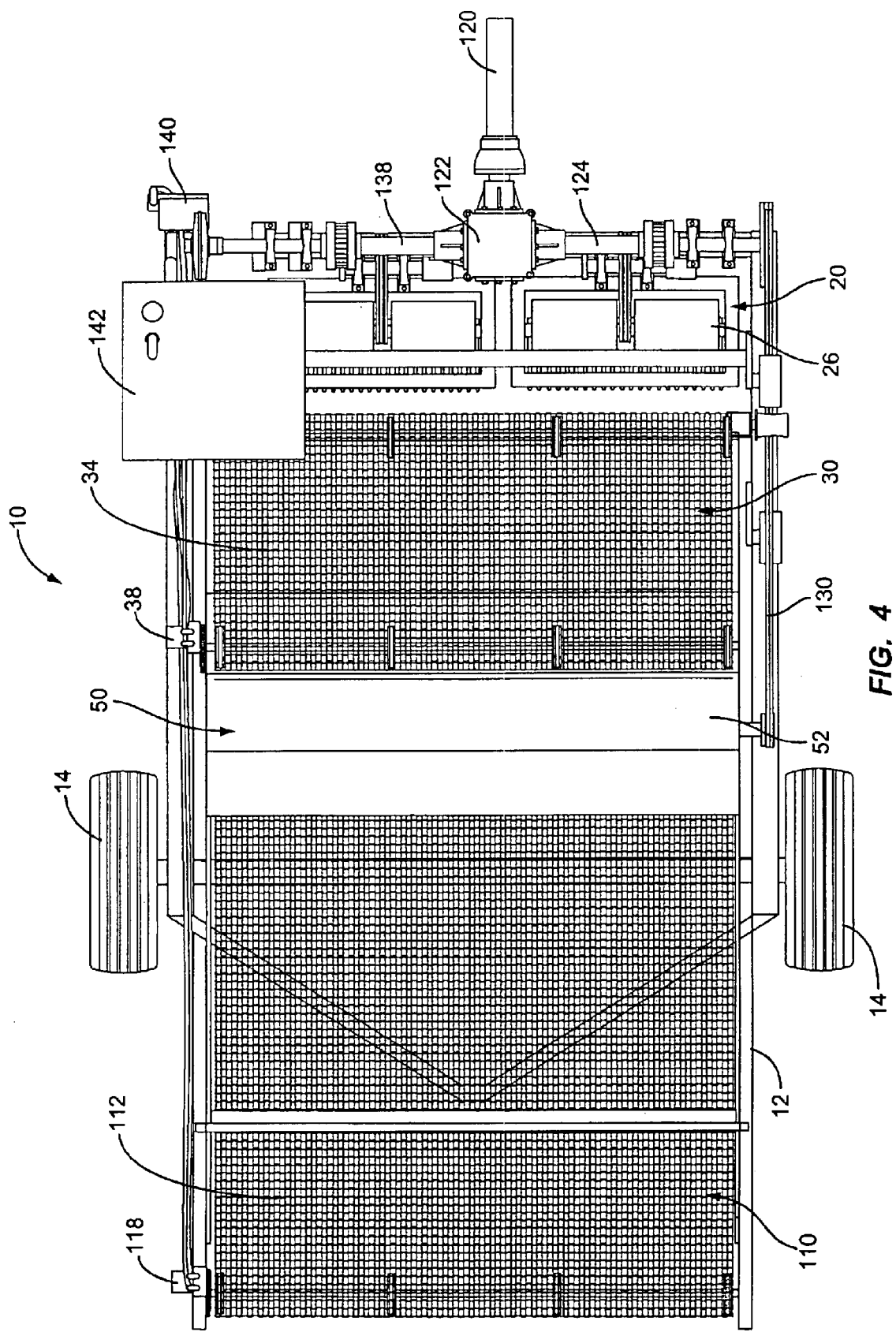
FIG. 4 is a top plan view of the sprig harvester.
Figure 5:
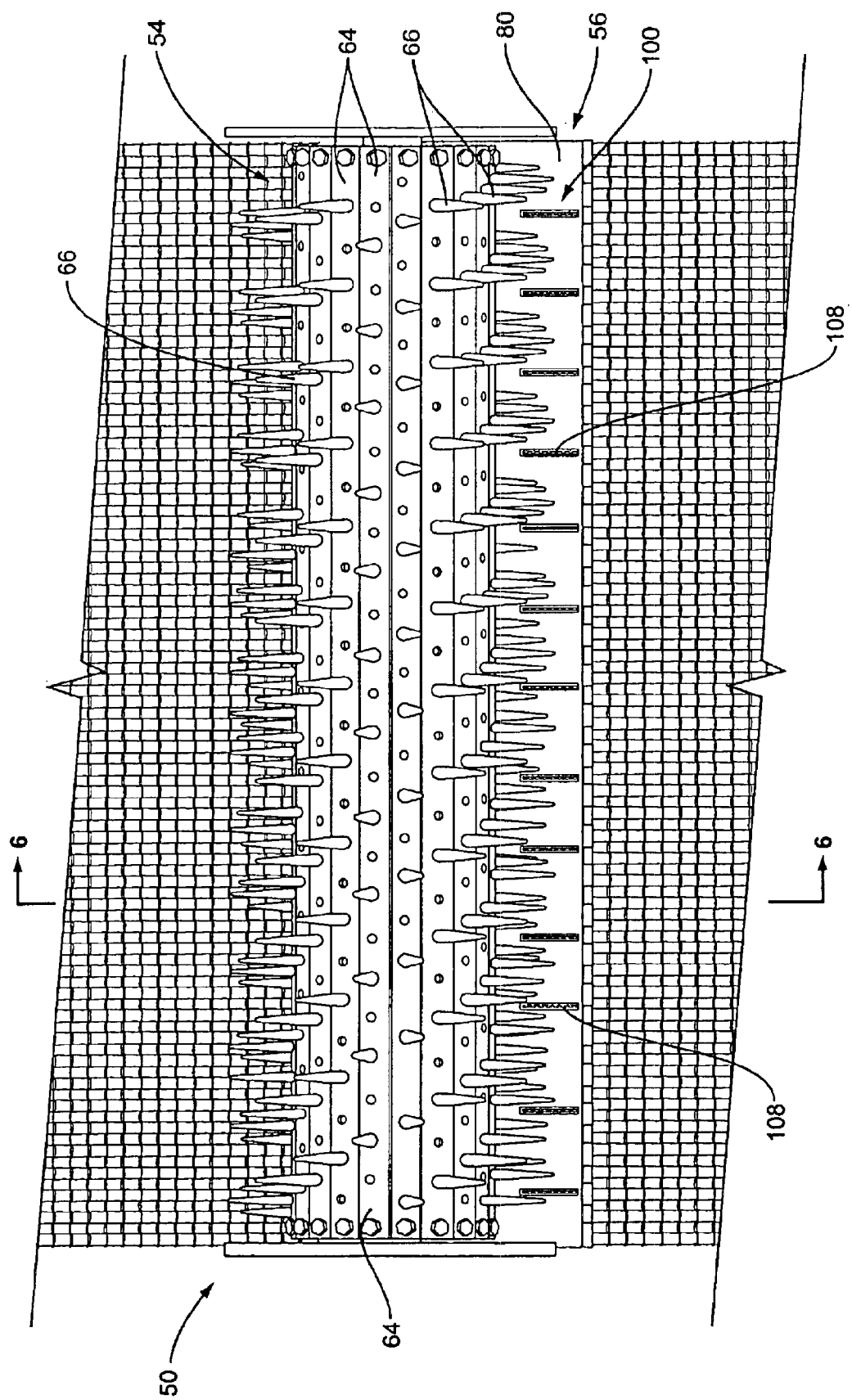
FIG. 5 is a fragmentary top plan view of the shredder and the associated concave.

Viewing the sprig harvester 10 as shown in FIGS. 1 and 4, it is seen that the same includes a mainframe 12. Supporting the mainframe 12 is a pair of wheels 14. Although not specifically shown, sprig harvester 10 includes a tongue that is adapted to extend forwardly therefrom for connection to the draw bar of a tractor.

Sprig harvester 10 is designed to carry out a sprig harvesting operation where during the course of harvesting the harvester will dig or cut a swath or section of turf or sod. Accordingly, in the case of the embodiment shown in FIGS. 1 and 4, the sprig harvester is provided with a pair of side-by-side cutting heads with each cutting head being indicated generally by the numeral 20. Details of the respective cutting heads are not dealt with herein because such is not per se material to the present invention and further cutting heads for cutting turf and sod are well known in the art and are commercially available on turf or sod harvesting machines. For example, reference is made to U.S. Pat. Nos. 5,626,195 and RE. 34,827. Both of these patents relate to sod harvesting machines and the disclosures of these two patents are expressly incorporated herein by reference. In any event, and returning to the cutting heads 20, it is seen that each cutting head includes a frame 22 that depends or is otherwise supported from the mainframe 12. Further, there is provided a transverse blade 24 that engages the ground and effectively cuts a swath of turf or sod as the sprig harvester is pulled through the field. Preceding each blade 24 is a roller 26. As will be appreciated from subsequent portions of this disclosure, as the sprig harvester 10 traverses the field, the blade 24 associated with each cutting head 20, will cut a shallow layer of soil containing the crop (grass) and this cut shallow layer of soil, which is referred to herein as turf or sod, is lifted upwardly from the ground, and as discussed below, guided onto a conveyor for further processing.

Figure 2:
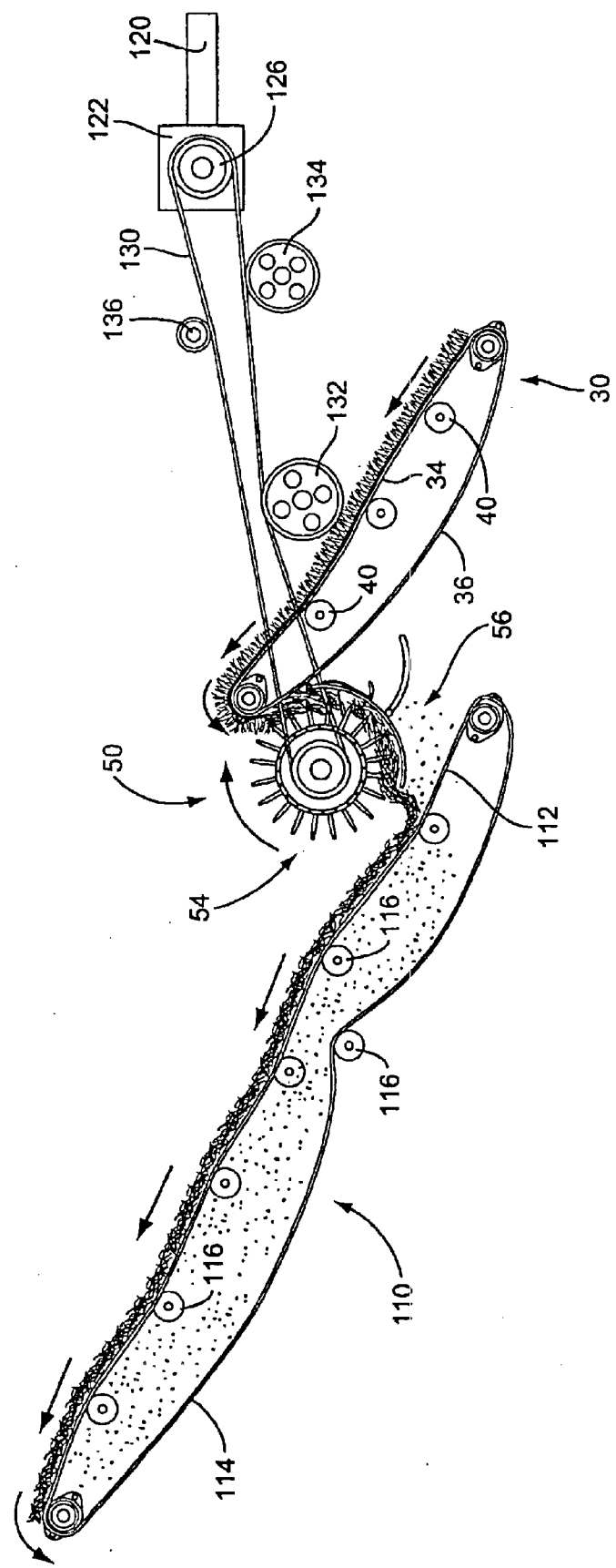
FIG. 2 is a side elevational schematic view illustrating the flow or movement of turf to a shredder disposed on the sprig harvesting machine.

Disposed behind or rearwardly of the cutting heads 20 is a first conveyor indicated generally by the numeral 30. First conveyor 30 includes a frame 32 that is supported directly or indirectly by the mainframe 12. First conveyor 30 includes an endless open type conveyor such as a chain link conveyor. By being open, the first conveyor 30 allows dirt and debris to fall through the conveyor as the sod or turf is conveyed along the same. In the drawings, the first conveyor 30 includes an upper run 34 and a lower run 36. Note in FIG. 1 where the first conveyor 30 is inclined. The front portion of the conveyor is disposed at a lower position adjacent the cutting heads 20. The other end, the rearward end, of the first conveyor 30 is elevated and terminates at a point higher than the forward end of the conveyor. About opposite end portions of the first conveyor 30, there is provided a shaft that includes a series of axially spaced drive sprockets thereon. The drive sprockets engage openings within the open type conveyor 30 as the conveyor is driven in the direction indicated in FIG. 2. Disposed below the upper run 34 is a series of idlers that tend to support the upper run of the conveyor. First conveyor 30 can be driven in any number of ways. In this case, a hydraulic motor 38 (FIG. 4) is utilized to drive the conveyor. In this case, hydraulic motor 38 is operatively connected to the drive shaft that extends transversely across the upper rear portion of the first conveyor 30.

As noted earlier, the cutting heads 20 function to cut a swath or section of turf or sod as the sprig harvester 10 traverses the field. This swath of turf or sod is directed by the respective cutting heads 20 up onto the lower front portion of the first conveyor 30. Thus, as the sprig harvester 10 moves through the field, the cutting heads 20 will provide a continuous swath of turf or sod that is directed up onto the first conveyor 30 and the first conveyor 30 will convey the swath of turf or sod, via the upper run 34, towards the upper rear discharge end of the first conveyor 30.

Disposed adjacent the upper rear discharge end of the first conveyor 30 is a shredder indicated generally by the numeral 50. Shredder 50 comprises a housing structure 52 that surrounds a portion of a rotary assembly indicated generally by the numeral 54 and a concave indicated generally by the numeral 56. Before discussing shredder 50 in more detail, it is seen from FIG. 3, that the first conveyor 30 discharges the swath of turf into the shredder 50, and particularly between the rotary assembly 54 and the concave 56. As will be discussed later, the cooperation of the rotary assembly 54 and the concave 56 will shred the swath of turf and in the process will produce sprigs which essentially comprises the turf or sod minus the soil and debris, but separated or cut into relatively small lengths which may tend to cling together in small groups or bundles.

Turning to a discussion of the rotary assembly 54, it is seen that the same includes an elongated cylinder 58 that is rotatively mounted and is driven by a shaft 60 that extends through the axis of the cylinder 58. Cylinder 58 includes an inner surface and an outer surface. Secured to the outer surface of cylinder 58 is a series of spaced apart circumferential bands 62. That is, the bands 62 are transversely spaced along the longitudinal axis of the cylinder 58. Secured across the top of the circumferential bands 62 is a series of bars 64. Each bar includes a series of openings formed therein. Extending through the openings within the bars 64 is a series of radials or tines 66. Each tine includes a head 66A that is disposed between a respective bar 64 and the outer surface of the cylinder 58.

Tines 66 can be retained within the respective bars 64 in any number of ways. In one example, the respective tines 66 can be threaded and screwed into a threaded opening within a respective bar 64. The radials or tines 66 can assume various shapes and configurations. In the example shown herein, the tines or radials 66 are rigid and project outwardly from the rotary assembly 54.

Figure 6:
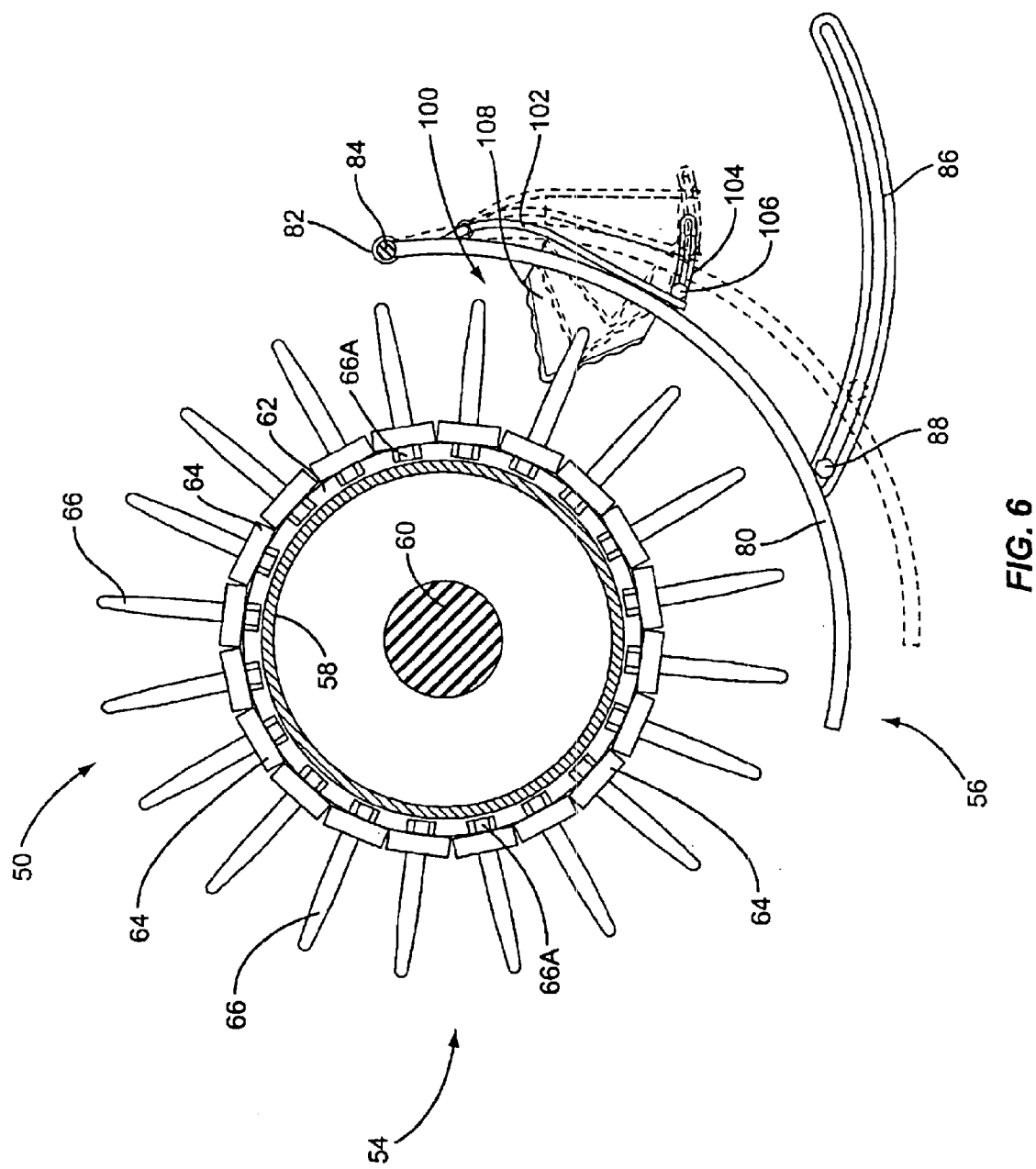
FIG. 6 is a sectional view taken through the line 6—6 of FIG. 5.

Turning to the concave 56, it is seen that the concave is disposed about the lower forward portion of the shredder 50. Concave 56 includes a curved or arcuate structure that includes an inner surface 80. Concave 56 is adapted to be adjustable with respect to the rotary assembly 54. That is, as viewed in FIG. 6, for example, the upper portion of the concave 56 includes a sleeve 82. A shaft 84 associated with the harvester 10 extends through the sleeve 82 and this permits the concave 56 to swing back and forth about the axis of the shaft 84. As shown in FIG. 6, concave 56 can be adjusted. This adjustment feature is provided by an arcuate shaped adjustment slot 86 and a bolt assembly 88 that is carried by the concave. The concave 56 can be swung back and forth and by securing the bolt assembly 88 within the adjustment slot 86, the concave can be set at any desired position within its adjustment range.

In the design illustrated herein, there is provided a series of projections, indicated generally by the numeral 100 that project from the inner surface 80 of the concave towards the rotary assembly 54. The projections 100 can assume various forms. In this case, the projections 100 are illustrated as blades 108. The blades shown are conventional sickle blades that are used in mowing machines. Concave 56 is provided with a series of transverse openings or slits that permit the projections 100 to project therethrough. In the embodiment illustrated herein, the respective projections or blades are secured to a rocker 102 that, as illustrated in FIG. 6, can be moved back and forth with respect to the concave 56. The projections 100, or in this case the blades 108, are secured to the rocker 102 and project from the front side or front surface of the concave 56 through the slots or openings therein and on towards the rotary assembly 54. In order to adjust and hold the rocker 102 in position, there is provided another adjustment slot 104 and an associate bolt assembly 106.

The spacing of the radials or tines 66 and the projections 100 are such that they overlap as shown in FIG. 6, but do not engage or interfere with one another as the rotary assembly 54 is driven. That is, viewing FIG. 6, the rotary assembly 54 is driven clockwise. The tines or radials 66 are spaced such that they pass between the respective blades 108.

Extending rearwardly from the shredder 50 is a second conveyor indicated generally by the numeral 110. Second conveyor 110 includes an upper run 112 and a lower run 114. Like the first conveyor 30, the second conveyor would preferably be of an open construction such as a chain link or open mesh conveyor. This enables dirt and debris to fall through the conveyor as the sprigs are conveyed along the upper run 112. Also, second conveyor 110 is structurally similar to the first conveyor 30 inasmuch as the same would include a shaft and associated drive sprockets formed about opposed end portions of the conveyor. Further, second conveyor 10 includes a series of idlers 116 that support the upper run 112 of the second conveyor. It should be noted that in one design the idlers 116 are particularly spaced with respect to the upper run 114 such that a shaking or agitating action is imparted to the upper run 112 as it passes over the idlers. This again shakes and agitates the sprigs traveling on the upper run and tends to clean the sprigs by shaking and agitating dirt and debris from the sprigs.

Like the first conveyor 30, the second conveyor 110 is hydraulically driven by hydraulic motor 118. As seen in FIG. 4, the hydraulic motor 118 is mounted adjacent the upper rear end portion of the second conveyor 110 and is operative to drive a shaft that extends transversely across the upper rear end of that conveyor.

Sprig harvester 10 includes a drive system for driving various components and sub-systems such as the conveyors 30 and 110 and the shredder 50. With particular reference to FIGS. 1 and 4, the drive system of the sprig harvester 10 comprises a drive shaft 120 that extends from the tractor and connects to a gear box 122. Gear box 122 is in turn connected to two drive shafts 124 and 138. Drive shaft 124, as particularly shown in FIG. 4, is operatively connected to a drive sheave 126 (FIG. 1). Shredder 50 includes a driven sheave 128 that is operatively connected to the drive shaft 60 of the rotary assembly 52. Trained around drive sheave 126 and driven sheave 128 is a belt 130. A series of idlers 132, 134 and 136 (FIG. 1) engage belt 130 and maintain the belt generally taught between the sheaves 126 and 128. It thus follows, that power from the tractor is transmitted via the drive shaft 120 through the gear box 122 and ultimately to belt 130 which drives the shredder 50.

On the other side of the gear box 122, the output shaft 138 is operative to drive a hydraulic pump 140. Hydraulic pump 140 is operative to pump hydraulic fluid from tank 142 through the pump and through a series of hydraulic hoses that extend along one side of the harvester 10 to the two hydraulic motors 38 and 118. As already noted, hydraulic motors 38 and 118 drive the respective conveyors, that is conveyors 35 and 110.

Figure 3:
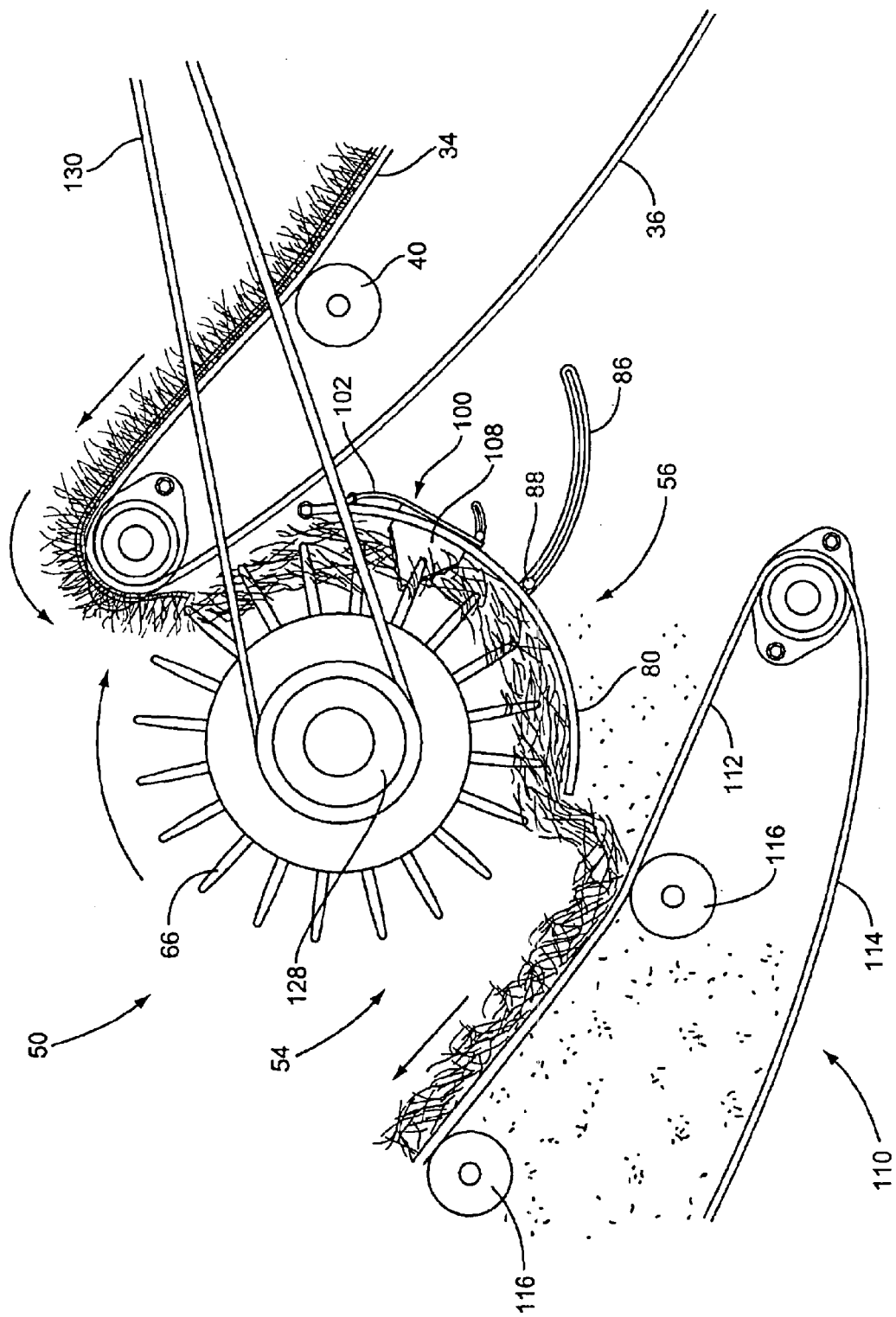
FIG. 3 is a fragmentary side elevational view illustrating the shredder.

In operation, the sprig harvester cuts one or more swaths of sod or turf and delivers the same to the upper run 34 of the first conveyor 30. As shown in FIG. 3, this swath of turf or sod is conveyed generally upwardly and rearwardly from the cutting heads 20 to the upper discharge end of the first conveyor 30. There the swath of turf is discharged into the shredder 50. More particularly, and as seen in FIG. 3, the swath of turf or sod is discharged into the forward side of the shredder 50. Particularly, the swath of turf or sod is discharged into the area between the rotary assembly 54 and the concave. Note that the rotary assembly 54 is driven clockwise as viewed in FIG. 3 and that this direction is generally counter to the direction of movement of the swath of turf as it is discharged from the first conveyor 30. Once the swath of turf or sod is disposed between the rotary assembly 54 and the concave 56, it is seen that the cooperative action of the radials 66 and the projections 100 act to shred, cut and separate the sprigs or grass portion of the turf or sod from the soil and debris that makes up the swath of turf or sod. Concave 56 is of a generally open mesh construction and this allows dirt, debris and other foreign material separated by the shredder 50 to fall there through. Note also that the lower end of the second conveyor 110 extends underneath the shredder 50 such that the produced sprigs that are discharged from the shredder 50 fall onto the upper run 112 of the conveyor.

Sprigs discharged from the shredder 50 onto the second conveyor 110 are conveyed upwardly and rearwardly to where they are discharged into a container or trailing wagon.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A sprig harvester for harvesting sprigs, comprising:
   a. a mainframe;
   b. at least one turf cutting head for cutting a swath of turf;
   c. a first conveyor disposed adjacent the turf cutting head for conveying the swath of turf from the cutting head; and
   d. a turf shredder for receiving portions of the swath of turf and shredding the swath of turf into sprigs, the turf shredder comprising:
      i. a rotary assembly rotatable about an axis that extends transverse to the direction of travel of the swath of turf moving on the first conveyor; and
      ii. a concave disposed adjacent the rotary assembly and spaced so as to permit the swath of turf to pass between the rotary assembly and the concave, and wherein the concave is cooperative with the rotary assembly to shred the swath of turf into sprigs.

2. The sprig harvester of claim 1 including a second conveyor for receiving the sprigs produced by the shredder and conveying the sprigs from the shredder.

3. The sprig harvester of claim 1 wherein the shredder includes a rotary assembly having an array of spaced apart radials extending therefrom.

4. The sprig harvester of claim 3 wherein the first conveyor is inclined generally upwardly and rearwardly and includes a rear terminal end that discharges portions of the swath of turf into the shredder.

5. The sprig harvester of claim 4 wherein the shredder is driven generally counter to the direction of travel of the swath of turf carried by the first conveyor.

6. The sprig harvester of claim 1 wherein the concave is adjustable relative to the rotary assembly.

7. The shredder of claim 6 wherein the concave is pivotally mounted for movement about a transverse axis.

8. The shredder of claim 1 wherein the shredder includes a series of projections that project from the concave towards the rotary assembly; and wherein the radials and projections are of a sufficient length that they project past each other, and wherein the radials and projections are spaced such that as the rotary assembly is driven, the radials and projections pass each other without interference.

9. The shredder of claim 1 wherein the shredder includes a series of blades that project from the concave towards the rotary assembly.

10. The shredder of claim 8 wherein the projections are adjustably mounted to the concave, and are movable through the concave such that the length of the projections extending from the inner side of the concave can be adjusted.

11. The sprig harvester of claim 1 further including:
    a. a second conveyor mounted on the harvester for receiving the sprigs and conveying the sprigs from the shredder; and
    b. a drive train mounted on the harvester for driving the shredder.

12. The sprig harvester of claim 11 wherein the first conveyor is inclined upwardly and rearwardly from the cutting head, and wherein the second conveyor is inclined upwardly and rearwardly from the shredder.

13. The sprig harvester of claim 12 wherein the shredder is located in an area adjacent a rear portion of the first conveyor and adjacent a front portion of the second conveyor.

14. The sprig harvester of claim 13 wherein a portion of the shredder underlies the first conveyor and overlies the second conveyor.

15. A method of harvesting sprigs with a harvester, comprising:
    a. traversing a field of turf with the harvester;
    b. cutting a swath of turf with the harvester;
    c. conveying the swath of turf to a shredder on the harvester; and
    d. shredding the swath of turf on the harvester as the harvester moves through the turf field to produce sprigs by conveying the swath of turf into an area between a rotary assembly and a concave, the rotary assembly and concave cooperating to shred the swath of turf into sprigs, wherein the rotary assembly rotates about an axis that is transverse to the direction of travel of the harvester.

16. The method of claim 15 including conveying the sprigs on the harvester to a discharge area.

17. The method of claim 16 including discharging the sprigs into a container.

18. The method of claim 15 including shredding the turf by discharging portions of the turf into an area between the rotary assembly and the concave, and rotatively driving the rotary assembly such that radials extending therefrom engage the turf and with the cooperation of the concave shred the turf into sprigs.

19. The method of claim 15 wherein shredding the swath of turf includes discharging the turf into the shredder having the rotary assembly and a set of blades and wherein the rotary assembly and set of blades cooperate to shred the turf into sprigs.

20. The method of claim 19 wherein the shredder includes the concave and wherein the blades project from an inner side of the concave towards the rotary assembly.

21. The method of claim 20 including adjusting the shredder by adjusting either the position of the concave with respect to the rotary assembly or adjusting the position of the blades with respect to the concave.

22. The method of claim 15 including conveying the swath of turf to an upper portion of the shredder and discharging the turf into the upper portion of the shredder, and further including catching the produced sprigs about an area below the upper portion of the shredder and conveying the sprigs generally upwardly therefrom to a discharge area.

23. A sprig harvester for harvesting sprigs, comprising:
   a. a mainframe;
   b. at least one turf cutting head for cutting a swath of turf;
   c. a first conveyor disposed adjacent the turf cutting head for conveying the swath of turf from the cutting head; and
   d. a turf shredder for receiving portions of the swath of turf and shredding the swath of turf into sprigs, the turf shredder comprising a rotary assembly rotatable about an axis that is transverse to the direction of travel of the swath of turf on the first conveyor, and wherein the rotary assembly is rotatively driven generally counter to the direction of travel of the swath of turf on the first conveyor.

24. The sprig harvester of claim 23, further comprising a concave disposed adjacent the rotary assembly and adapted to cooperate with the rotary assembly to shred the swath of turf into sprigs.

25. The sprig harvester of claim 24 wherein the concave is pivotally adjustable relative to the rotary assembly about a transverse axis.

26. The sprig harvester of claim 24 wherein the shredder includes a series of blades that project from the concave towards the rotary assembly.

27. The sprig harvester of claim 26 wherein the blades are adjustably mounted to the concave, and are movable through the concave such that the length of the blades extending from the inner side of the concave can be adjusted.

* * * * *